(12) United States Patent
Crawford et al.

(10) Patent No.: US 7,624,336 B2
(45) Date of Patent: Nov. 24, 2009

(54) SELECTION OF STATUS DATA FROM SYNCHRONOUS REDUNDANT DEVICES

(75) Inventors: Timothy James Crawford, Beaverton, OR (US); James Mathew Davison, Tucson, AZ (US); Daniel Fernando de Araujo, Tucson, AZ (US); Paul Matthew Richards, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 901 days.

(21) Appl. No.: 10/984,071

(22) Filed: Nov. 8, 2004

(65) Prior Publication Data

US 2006/0112308 A1    May 25, 2006

(51) Int. Cl.
    *G06F 11/00* (2006.01)
(52) U.S. Cl. .................. 714/820; 375/341; 382/151
(58) Field of Classification Search .................. 714/820
    See application file for complete search history.

(56) References Cited

U.S. PATENT DOCUMENTS

| | | | |
|---|---|---|---|
| 6,131,182 A | 10/2000 | Beakes et al. | |
| 6,370,605 B1* | 4/2002 | Chong, Jr. ..................... | 710/33 |
| 6,496,942 B1 | 12/2002 | Schoenthal et al. | |
| 6,963,863 B1* | 11/2005 | Bannon ......................... | 707/3 |
| 2001/0033626 A1* | 10/2001 | Symes et al. ................. | 375/341 |
| 2002/0083410 A1 | 6/2002 | Wu et al. | |

OTHER PUBLICATIONS

Ion Musleas, Steven Minton and Craig A. Knoblock, Selective Sampling With Redundant Views,2000,aaai.org,pp. 1-6.*
S.L. Hight, et al., "Dissent in a Majority Voting System", IEEE Transactions on Computers, vol. C-22, No. 2, Feb. 1973, pp. 168-171.
S. Easterbrook, et al., "A Framework for Multi-Valued Reasoning Over Inconsistent Viewpoints", IEEE 2001, pp. 411-420.
D.M. Weiss, et al., "Goal-Oriented Software Assessment", ACM, 2002, pp. 221-231.
E.S. Ida, et al., "Redundancy Used in Fail-Safe Alarm Design", Control Engineering, vol. 30, No. 2, Feb. 1983, pp. 89-91.
E.S. Ida, et al., "Electronic Alarm Switch Uses Fail-Safe Design Concepts", Control Engineering, vol. 30, No. 3, Mar. 1983, pp. 86-88.
J. Herlocker, et al., "Evaluating Collaborative Filtering Recommender Systems", ACM Transactions on Information Systems, vol. 22, No. 1, Jan. 2004, pp. 5-19.
B.W. Boehm, et al., "Quantitative Evaluation of Software Quality", TRW Systems and Energy Group, pp. 592-605.

(Continued)

*Primary Examiner*—M. Mujtaba K Chaudry
*Assistant Examiner*—Enam Ahmed
(74) *Attorney, Agent, or Firm*—Janaki K. Davda; Konrad Raynes & Victor LLP (57) ABSTRACT

Techniques are provided for selecting status data. Redundant views are obtained from multiple synchronous redundant devices. It is determined that the redundant views from the multiple synchronous redundant devices are conflicting. A redundant view score is calculated for each of the redundant views based on one or more characteristics from each of at least two characteristic types, wherein the characteristics are associated with weighted scores. One of the redundant views is selected based on the calculated redundant view score for each of the redundant views.

31 Claims, 7 Drawing Sheets

OTHER PUBLICATIONS

K. Bernstein, "Estimation of the Reliability of Digital M-of-N Systems with Failure-Indicating Components", Verlag Technik Berlin, Measurement Control Regulation, vol. 21, No. 2, Feb. 1978, pp. 91-95.

M., Ion, S. Minton, and C.A. Knoblock, "Selective Sampling with Redundant Views", Proceedings of the Seventeenth National Conference on Artificial Intelligence and Twelfth Conference on Innovative Applications of Artificial Intelligence, 2000, AAAI, pp. 6.

* cited by examiner

Scores for Physical Characteristics:

Status Register = All zeroes (i.e., 0x00 or 00000000)   -1
(In some cases, 0x00 may reflect a status register that is failing to report any status whatsoever.)

Status Register = All ones (i.e., 0xFF or 11111111)   -4
(There are no valid 0xFF conditions. 0xFF typically involves redundant synchronous device hardware failure in a status register.)

Reserved or unimplemented bit active in active interrupt register   -5
(Reserved bits should be 0x00.)

Active interrupt = Mask Register   +2
(The transition bits that were unmasked are now active, which implies an expected transition.)

Status register = ~(Mask Register)   +2
(No transition has occurred - the current status is completely masked, and the state is a steady state.)

SELECTION OF STATUS DATA FROM SYNCHRONOUS REDUNDANT DEVICES

BACKGROUND

1. Field

Implementations of the invention relate to selection of status data from synchronous redundant devices.

2. Description of the Related Art

Some computing systems may be connected to two redundant devices. Redundant devices refer to multiple (i.e., two or more) units of a same device (e.g., multiple power supplies). With redundant devices, if one of the redundant devices fails, the computing system may be able to rely on one or more other redundant devices that have not failed. For example, a computing system may be connected to two power supplies. If one power supply fails, the computing system continues to function using power from the other power supply.

The term "redundant path" or "redundant view" may be used to describe a snapshot of status data gathered from a device that is obtained through a given means (e.g., over a given communication path between each redundant device and the computing system to which the redundant device is connected or by accessing global status data).

Each redundant device may provide status data to the computing system via status registers. When the redundant devices are functioning correctly, the status data received from the redundant devices should be the same. When a computing system simultaneously receives status data from the status registers of two or more redundant devices, there is the possibility that status data in one of the status registers (i.e., one redundant view) is different from status data in another status register (i.e., another redundant view), which signals that one of the redundant views has incorrect status data.

For certain computing systems, a Longitudinal Redundancy Check (LRC) or Cyclic Redundancy Check (CRC) value may be added by the redundant device to status data before transfer and then checked upon receipt by the computing system. Nevertheless, LRC is an expensive solution for simple or inexpensive devices, involves overhead on both send and receive, and does nothing for cases where bad data is encoded with a good LRC value. Furthermore, because of the move to use more off-the-shelf devices (e.g., power supply devices), it is becoming more desirable to have devices that do not require LRC or CRC encoding capability.

Some other computing systems arbitrarily select status data from one of the redundant views when the status data reported from redundant devices is different. Although this technique is used often, even on some enterprise-class systems, this technique is not sufficiently intelligent for a highly available system. A highly available system is one that provides availability of the computing system when one device fails by using redundant devices.

For example, consider two power supply devices reporting battery status for a large disk system where the battery status disagrees across redundant views. In this example, one power supply device reports a battery status showing that battery power is high (e.g., power is available), while the other power supply device reports a battery status showing that battery power is low. In this case, the selection of the battery status that shows that power supply is high when this is incorrect (i.e., actually battery power is low) results in a risk of leaving volatile data unprotected, while the selection of the battery status that shows that power supply is low when this is incorrect (i.e., actually battery power is high) results in a risk of shutting down the computing system unnecessarily.

Yet other computing systems implement a third technique in which a single characteristic or a small group of characteristics are used to determine which redundant view to use in selecting status data when redundant devices report different status data. For example, one redundant view may be selected based on which redundant view has more active interrupts (i.e., a status change), or which redundant view shows status data whose values correspond to more severe or critical conditions (e.g., a power supply on fire is more critical than a power supply that is low on battery power).

While single characteristic decisions provide improved accuracy over an arbitrary selection, there are rarely just one or two criteria that correctly define a "good" or "preferred" redundant path for all cases. Furthermore, such techniques put too much weight in one or two characteristics and no weight on other characteristics. Thus, there is a continued need in the art for improved selection techniques.

SUMMARY OF THE INVENTION

Provided are a method, article of manufacture, and system for selecting status data. Redundant views are obtained from multiple synchronous redundant devices. It is determined that the redundant views from the multiple synchronous redundant devices are conflicting. A redundant view score is calculated for each of the redundant views based on one or more characteristics from each of at least two characteristic types, wherein the characteristics are associated with weighted scores. One of the redundant views is selected based on the calculated redundant view score for each of the redundant views.

BRIEF DESCRIPTION OF THE DRAWINGS

Referring now to the drawings in which like reference numbers represent corresponding parts throughout.

DETAILED DESCRIPTION OF THE IMPLEMENTATIONS

In the following description, reference is made to the accompanying drawings which form a part hereof and which illustrate several implementations of the invention. It is understood that other implementations may be utilized and structural and operational changes may be made without departing from the scope of the invention.

Implementations of the invention use a combination of physical, logical, and virtual characteristics to select status data from one of multiple (e.g., two or more) synchronous redundant devices. The term "synchronous redundant devices" is used to describe devices that are multiple units of a same type of device (e.g., they are all power supply devices) and that are in synch with each other. In certain implementations, the synchronous redundant devices are reporting different (i.e., conflicting) status data. Physical characteristics may be described as ones that look at actual hardware indicators (e.g., bits in a register) in the status data. Logical characteristics may be described as ones that look at what the values of the hardware indicators represent. Virtual characteristics may be described as other characteristics, such as characteristics directly relating to other hardware devices, other system/device indicators or relating to the overall synchronous redundant device. Thus, implementations of the invention select status data when two different sets of status data that present mutually exclusive status cannot be simultaneously analyzed.

Figure 1:
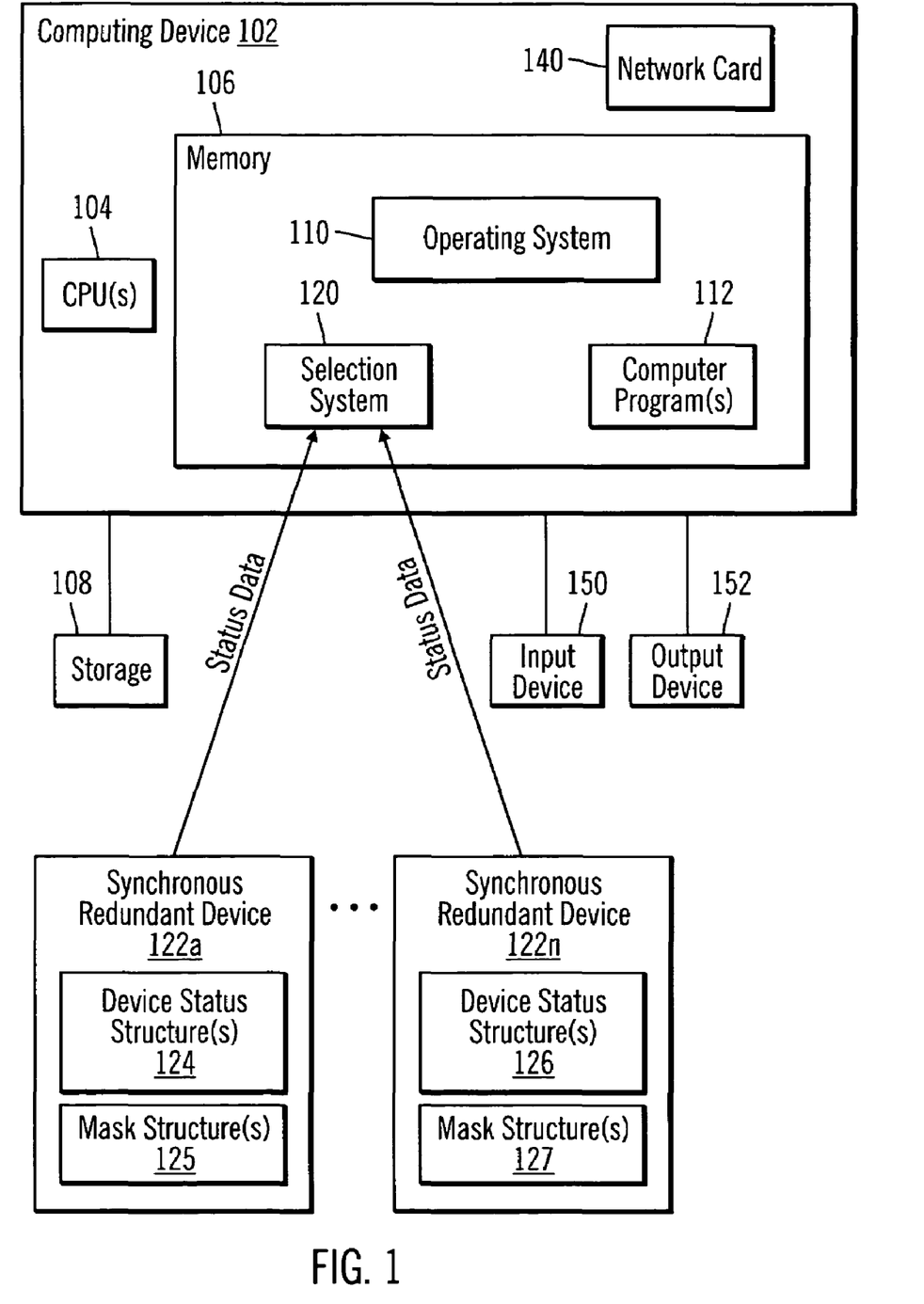
FIG. 1 illustrates details of a computing device in which certain implementations of the invention may be implemented.

FIG. 1 illustrates details of a computing device 102 in which certain implementations of the invention may be implemented. A computing device 102 includes one or more central processing units (CPUs) 104, a volatile memory 106, and non-volatile storage 108 (e.g., magnetic disk drives, optical disk drives, a tape drive, etc.). Volatile memory 106 stores an operating system 110, one or more computer programs 112, and a selection system 120. The selection system 120 may be used to select one of two or more redundant views.

The computing device 102 may comprise any computing device known in the art, such as a data processing system, mainframe, server, personal computer, workstation, laptop, handheld computer, telephony device, network appliance, virtualization device, storage controller, etc. Any CPU 104 and operating system 110 known in the art may be used. Computer programs and data in volatile memory 106 may be swapped into storage 108 as part of memory management operations.

The storage 108 may comprise an internal storage device or an attached or network accessible storage. Computer programs in the storage 108 may be loaded into the volatile memory 106 and executed by the CPU 104. An optional input device 150 is used to provide user input to the CPU 104, and may include a keyboard, mouse, pen-stylus, microphone, touch sensitive display screen, or any other activation or input mechanism known in the art. An optional output device 152 is capable of rendering information transferred from the CPU 104, or other component, such as a display monitor, printer, storage, etc. The computing device 102 further includes a network card 140 to enable communication with a network. Various structures and/or buffers (not shown) may reside in volatile memory 106 or may be located in a storage unit separate from the volatile memory 106 in certain implementations. The computing device 102 of the computer systems may include fewer components than illustrated, additional components not illustrated herein, or some combination of the components illustrated and additional components.

Synchronous redundant devices 122a . . . 122n are connected to computing device 102. The ellipses in FIG. 2 indicate that there may be more than two synchronous redundant devices 122a . . . 122n connected to computing device 102. The devices 122a . . . 122n may be, for example, power supply devices, sensors, or monitoring units. Each synchronous redundant device 122a . . . 122n includes one or more device status structures (e.g., registers) 124, 126 and one or more mask structures (e.g., mask registers) 125, 127, respectively. The device status structures 124, 126 store status data for physical, logical, and virtual characteristics. In certain implementations, each synchronous redundant device 122a . . . 122n includes the same set of device status structures 124, 126. The synchronous redundant devices 122a . . . 122n send status data from the device status structures 124, 126 to the computing device 102. The selection system 102 at the computing device 102 selects one of the redundant views and uses the status data received from that redundant view.

Figure 2:
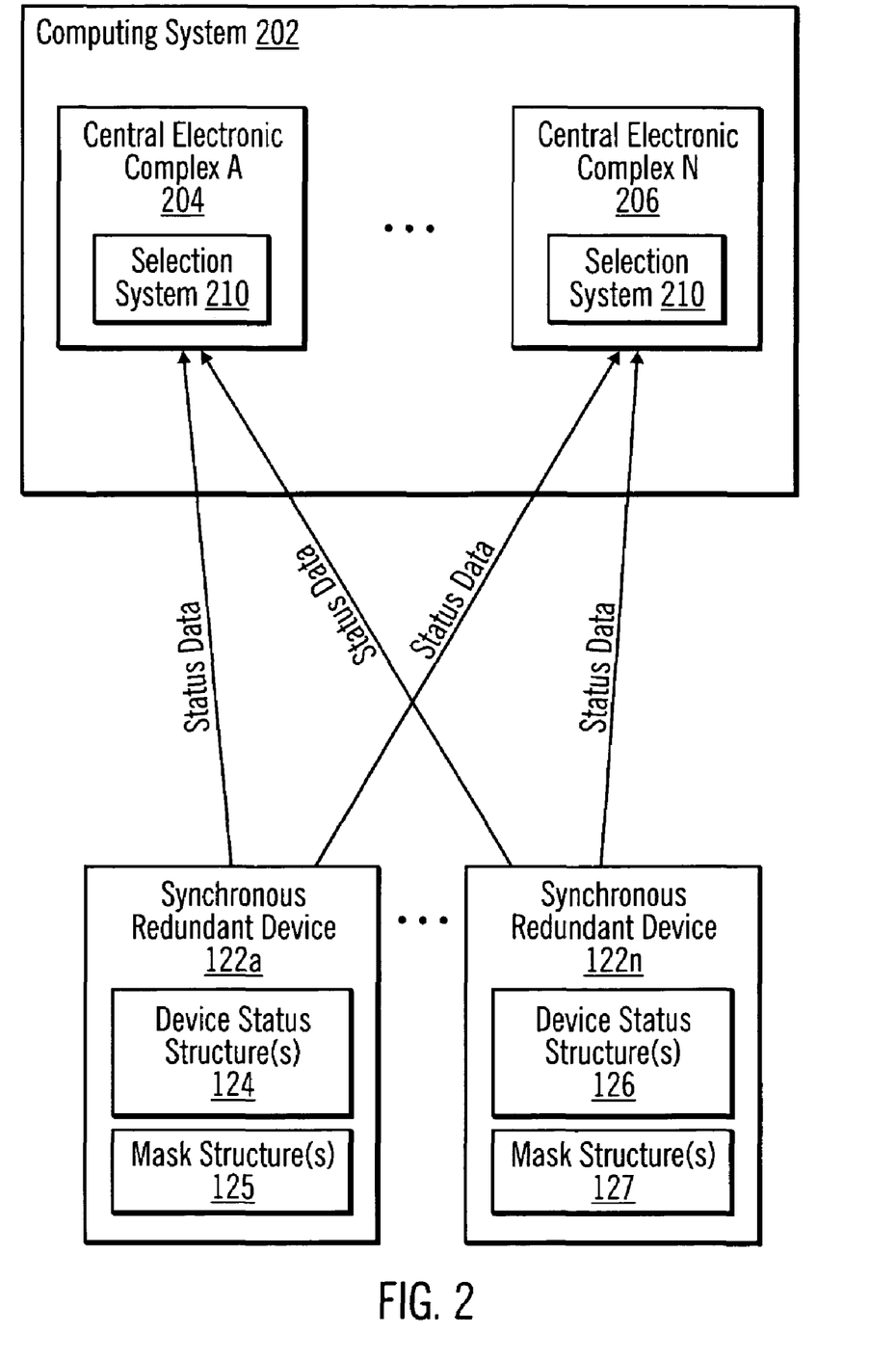
FIG. 2 illustrates details of a computing system in which certain implementations of the invention may be implemented.

FIG. 2 illustrates details of a computing system 202 in which certain implementations of the invention may be implemented. Computing system 202 includes two or more central electronic complexes (CECs) 204 . . . 206. Each central electronic complex 204 . . . 206 may be a computing device 102. In FIG. 2, each central electronic complex 204 . . . 206 is illustrated as including a selection system 120. In alternative implementations, one or a subset of the central electronic complexes 204 . . . 206 include the selection system 120, in which case the status data is routed to the selection system 120 at the one or the subset of central electronic complexes 204 . . . 206 for processing. When the synchronous redundant devices 122a . . . 122n send status data to multiple central electronic complexes 204 . . . 206, if the data received by the different central electronic complexes 204 . . . 206 does not match, then a transmission error is detected in the transmission of status data from the synchronous redundant devices 122a . . . 122n to the central electronic complexes 204 . . . 206.

Figure 3:
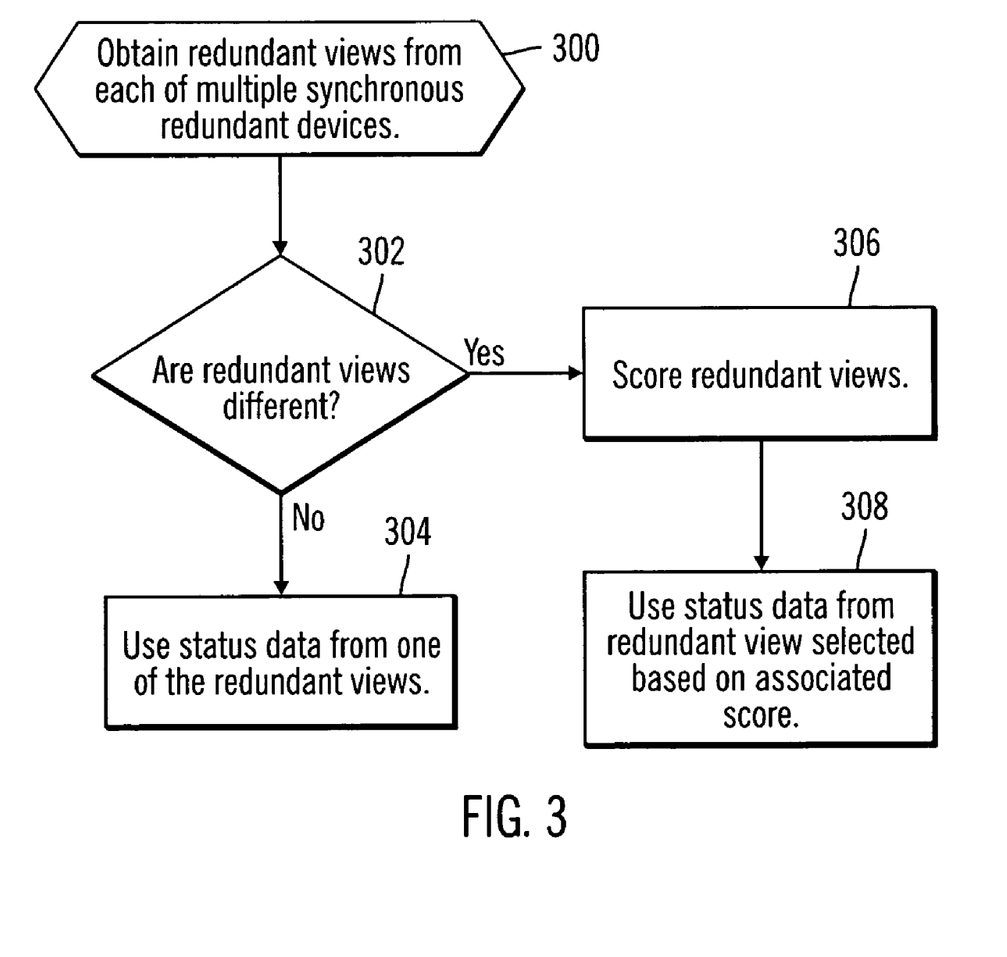
FIG. 3 illustrates logic for processing status data in accordance with certain implementations of the invention.

FIG. 3 illustrates logic for processing status data in accordance with certain implementations of the invention. Control begins at block 300 with the selection system 120 obtaining redundant views (i.e., snapshots of status data) from each of multiple synchronous devices. In certain implementations, the synchronous redundant devices 122a . . . 122n send status data to the computing device 102 (FIG. 1) or computing system 202 (FIG. 2) based on a condition. For example, if an active interrupt occurs at one of the synchronous redundant devices 122a . . . 122n, then a synchronous redundant device 122a . . . 122n sends an interrupt to the computing device 102 (FIG. 1) or computing system 202 (FIG. 2), then the computing device 102 (FIG. 1) or computing system 202 (FIG. 2) collects status data from each synchronous redundant device 122a . . . 122n.

In certain alternative implementations, the synchronous redundant devices 122a . . . 122n periodically send status data to the computing device 102 (FIG. 1) or computing system 202 (FIG. 2). In yet other alternative implementations, the computing device 102 (FIG. 1) or computing system 202 (FIG. 2) polls each synchronous redundant device 122a . . . 122n for status data. In yet other implementations, the synchronous redundant devices 122a . . . 122n store status data in a global pool, and the computing device 102 or computing system 202 retrieves status data from the global pool.

In block 302, the selection system 120 determines whether the redundant views are different (e.g., conflicting). For example, the status data comes from multiple device status structures 124, 126 from each synchronous redundant device 122a . . . 122n. In certain implementations, when the device status structures 124, 126 are registers with bits, the status data from the synchronous redundant views is different if any of the bits in corresponding status registers do not entirely match (e.g., bits 0001 do not match bits 0010). Corresponding device status structures 124, 126 are intended to convey a same type of information. For example, a STATUS A device status structure at synchronous redundant device 122a would correspond to a STATUS A device status structure at synchronous redundant device 122n. If the status data is different, processing continues to block 306, otherwise, processing continues to block 304.

In block 304, the status data of one of the redundant views is used for further processing. For example, if the status data indicates that the battery is low or the power supply is faulty, then the computing device 102 (FIG. 1) or computing system 202 (FIG. 2) may shut down.

In block 306, scores are associated with each of the redundant views. Further details of scoring the redundant views are described with reference to FIG. 4. In block 308, the status data from a redundant view that is selected based on an associated score is used for further processing. In certain implementations, the selection system 120 also performs additional analysis to handle the redundant views that are not selected. For example, status data from a redundant view that is not selected may be discarded. Also, the synchronous redundant device 122a . . . 122n with which the non-selected redundant view is associated or the path from that synchronous redundant device 122a . . . 122n may be set offline. Moreover, a replacement may be requested for the synchronous redundant device 122a . . . 122n with which the non-selected redundant view is associated or the path from that synchronous redundant device 122a . . . 122n.

Figure 4:
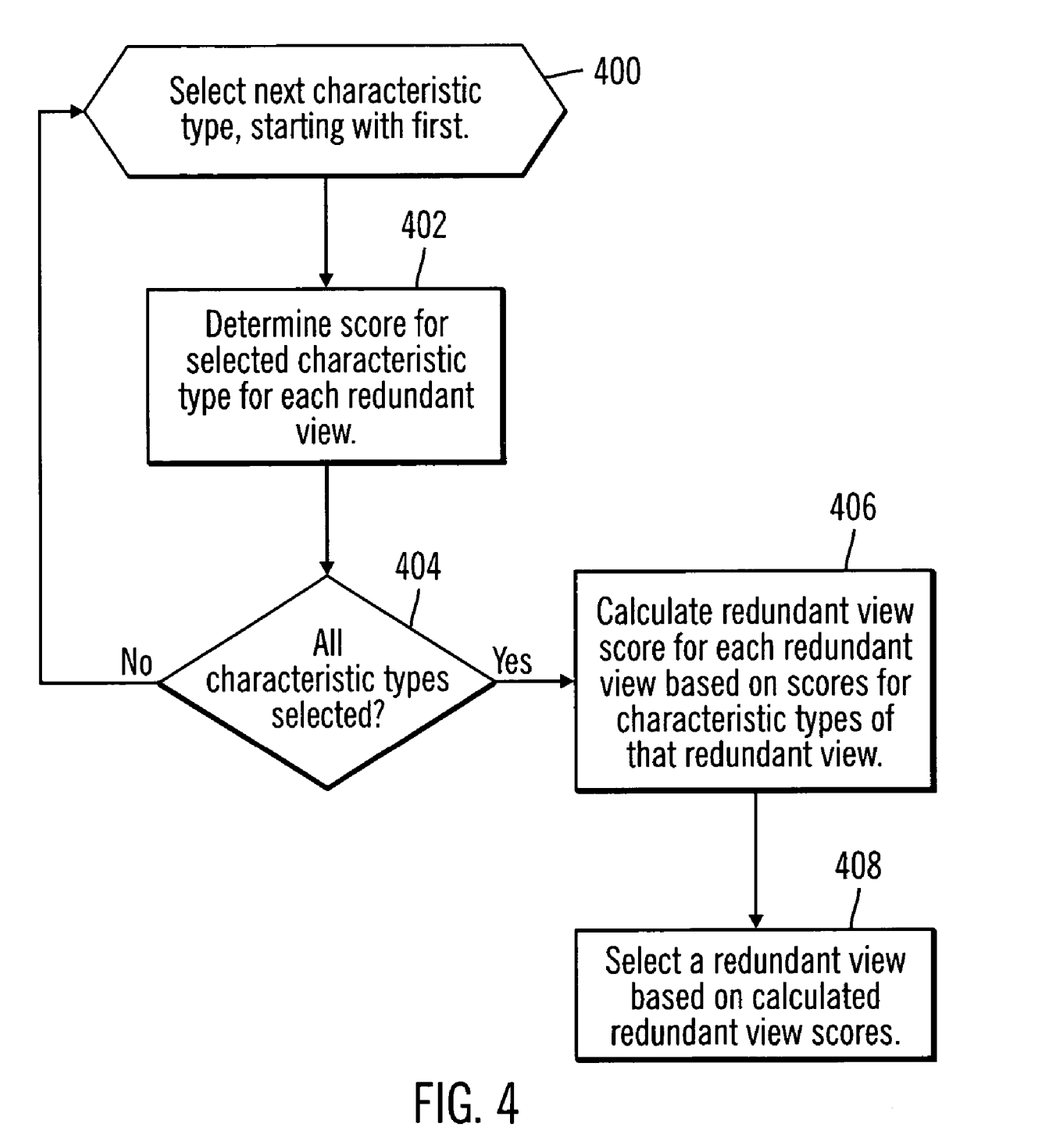
FIG. 4 illustrates logic for selecting a redundant view in accordance with certain implementations of the invention.

FIG. 4 illustrates logic for selecting a redundant view in accordance with certain implementations of the invention. Control begins at block 400 with the selection system 102 selecting a next characteristic type, starting with a first characteristic type. In certain implementations, the characteristic types are: physical, logical, and virtual. In block 402, the selection system 102 determines a score for the selected characteristic type for each redundant view. In certain implementations, the characteristic types are physical, logical, and virtual, and scores are assigned to possible values for physical, logical, and virtual characteristics. Then, a score is determined for a characteristic type based on the values of the status data for the characteristics of the selected characteristic type.

In block 404, the selection system 102 determines whether all characteristic types have been selected. If all characteristic types have been selected, then processing continues to block 406, otherwise, processing loops back to block 400 to select a next characteristic type. In block 406, the selection system 120 determines a score for each redundant view based on the scores for the characteristic types of that redundant view. In certain implementations, the scores for the characteristic types for a redundant view are added together to obtain a redundant view score. In block 408, the selection system 120 selects a redundant view based on the redundant view scores. In certain implementations, the redundant view with the highest redundant view score is selected. In certain other implementations, the redundant view with the lowest redundant view score may be selected, depending on how scores are allocated and weighted for different criteria.

Thus, implementations of the invention quantitatively score redundant views based on a large number of characteristics that are weighted and based on a large number of samples (e.g., status data from a large number of different redundant views is processed to select one redundant view). In certain implementations, the characteristics are predefined, but, in alternative implementations the characteristics may be designed and modified by, for example, a user, by an external stimulus, or by the computing system 202, while the computing device 102 or computing system 202 are in operation.

In order to provide a better understanding of the invention, an example will be described. However, it is not intended that the example limit the invention in any manner.

In the example, two synchronous redundant devices 122a and 122n are connected to central electronic complexes 204, 206 at computing system 202. For this example, the synchronous redundant devices 122a and 122n are Rack Power Controller Card 0 (RPC-0) and Rack Power Controller Card 1 (RPC-1), respectively. The Rack Power Controller Cards report status data for power, cooling, temperature, etc. The synchronous redundant devices 122a and 122n are both reporting power status data simultaneously to the central electronic complexes 204, 206. The status data consist of approximately 1.6 KB of 1-byte status registers and mask registers. This status data tracks power, cooling, and communication in the power system for computing system 202, including all data for the battery backup units that protect volatile customer data. Byte status registers present status as a bitmask, and have the format illustrated in TABLE-1:

TABLE 1

| BIT | NAME | DESCRIPTION |
| --- | --- | --- |
| 7 (0x80) | RESERVED | Reserved for later use |
| 6 (0x40) | STATUS A | Status A true |
| 5 (0x20) | STATUS B | Status B true |
| 4 (0x10) | STATUS C | Status C true |
| 3 (0x08) | RESERVED | Reserved for later use |
| 2 (0x04) | NOT STATUS A | Status A NOT true |
| 1 (0x02) | NOT STATUS B | Status B NOT true |
| 0 (0x01) | NOT STATUS C | Status C NOT true |

Merely as an example, in Table-1, STATUS A may indicate that power is on, while NOT STATUS A would indicate that power is off. If both the "STATUS" and "NOT STATUS" values of a status register are true, then this is suggestive of an internal problem. For example, it would not make sense for power to be on (STATUS A is true) and for power to be off (NOT STATUS A is true).

In this example, both central electronic complexes 204, 206 receive a copy of the status data in status registers of each synchronous redundant device 122a and 122n when one of the synchronous redundant devices 122a and 122n has an active interrupt. These redundant views are then sent to a single selection system 120 on one central electronic complex 204, 206 for analysis.

Figure 5:
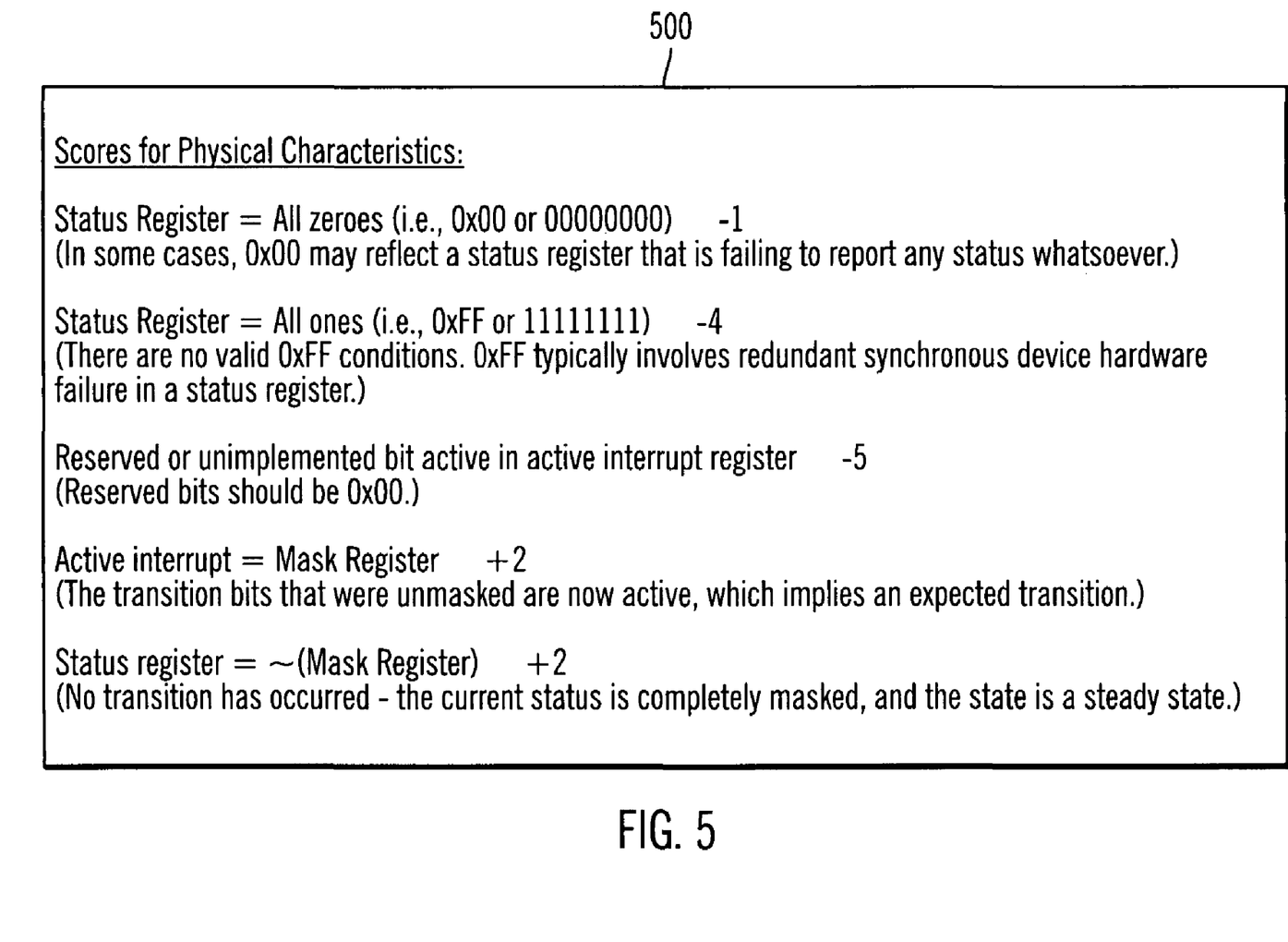
FIG. 5 illustrates scores for physical characteristics in accordance with certain implementations of the invention.
Figure 6:
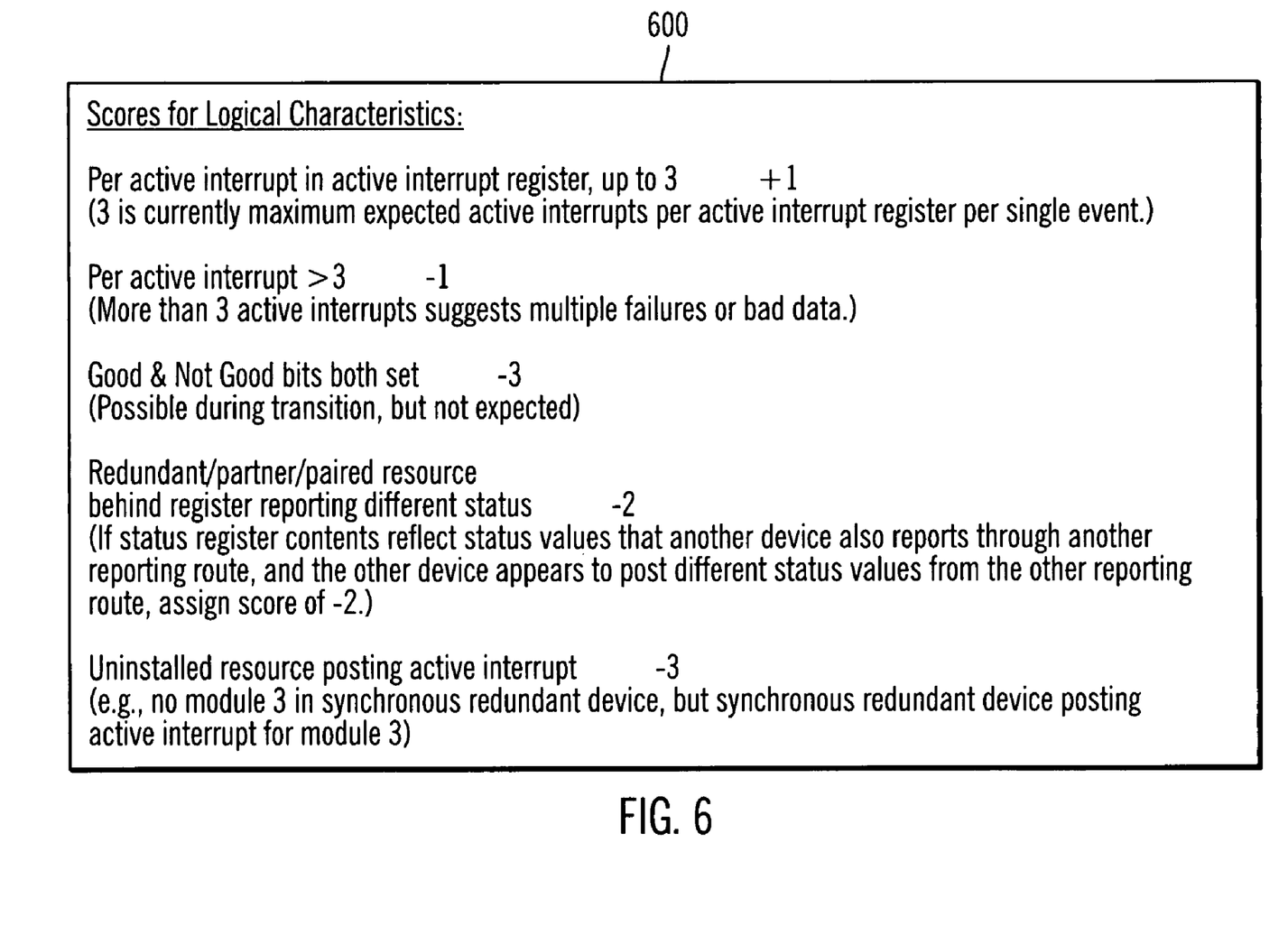
FIG. 6 illustrates scores for logical characteristics in accordance with certain implementations of the invention.
Figure 7:
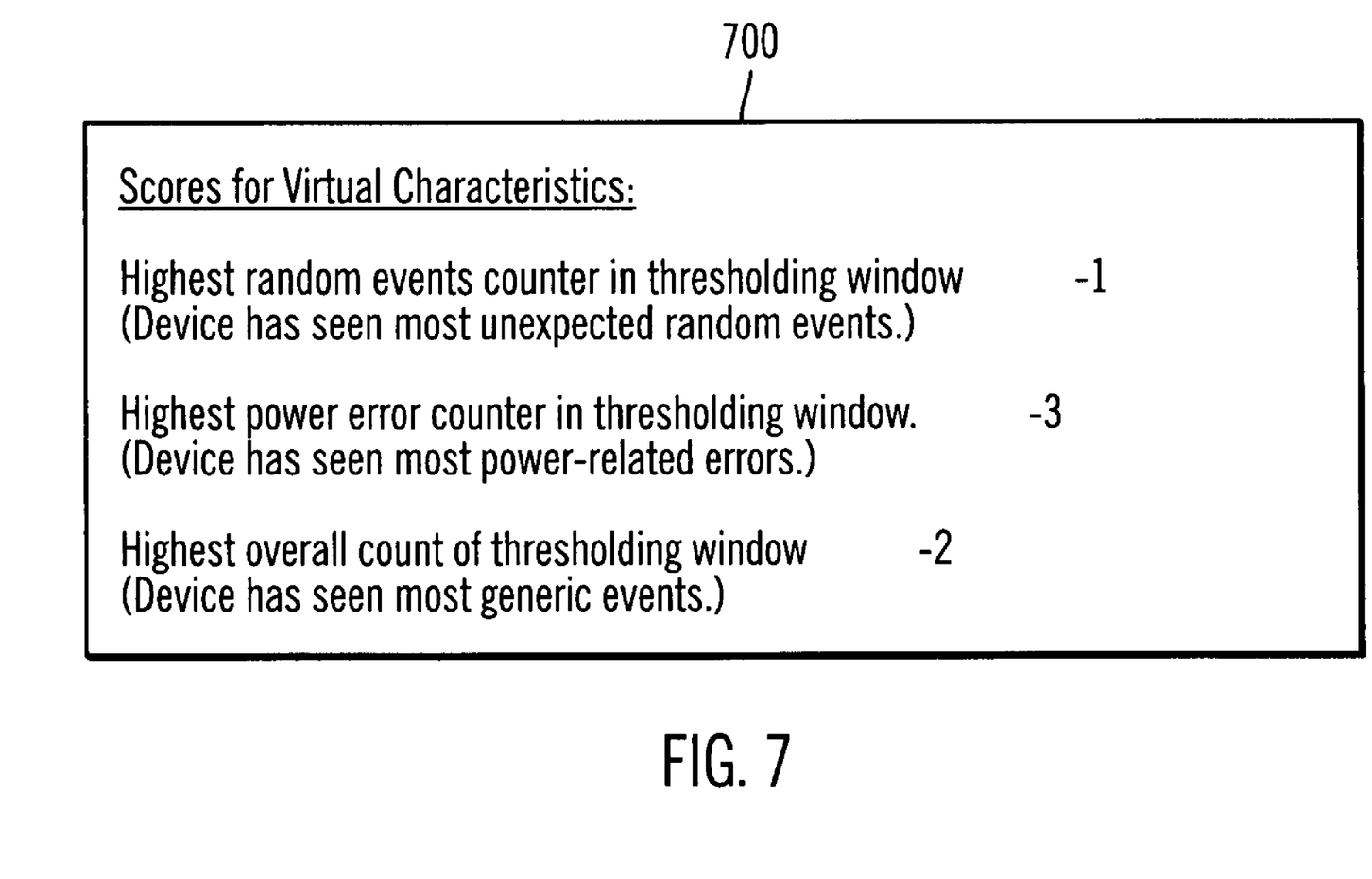
FIG. 7 illustrates scores for virtual characteristics in accordance with certain implementations of the invention.

FIGS. 5-7 illustrate possible scores for some physical, logical, and virtual characteristics in accordance with certain implementations of the invention. In other implementations, the illustrated characteristics may be assigned different scores and other characteristics may be used. In certain implementations, a systems designer may determine the scores prior to the computing device 102 or computing system 202 being in operation or while the computing device 102 or computing system 202 is in operation. The criteria used for scoring are considered in proportion to their influence, likelihood, and/or impact. The criteria for different devices may be set or bypassed based on the type of device. Thus, variably weighted scores may be assigned to different characteristics.

In the examples of FIGS. 5-7, the device status structures are status registers storing bits.

FIG. 5 illustrates scores for physical characteristics 500 in accordance with certain implementations of the invention. For example, if a status register has the value of all zeroes (i.e., 0x00 or 00000000), then a score of (−1) is assigned to the redundant view for this physical characteristic because, in some cases, 0x00 may reflect a status register that is failing to report any status. If a status register has the value of all ones (i.e., 0xFF or 11111111), then a score of (−4) is assigned to the redundant view for this physical characteristic because there are no valid 0xFF conditions. If the reserved or unimplemented bit is active in the status register, then a score of (−5) is assigned to the redundant view for this physical characteristic. If the active interrupt is the same as the mask register, then a score of (+2) is assigned to the redundant view for this physical characteristic. For this example characteristic, an active interrupt is the result of performing an AND operation on a status register and a mask register. A mask register is used to hide certain characteristics. If the values of the status register are the opposite of the values of the mask register (i.e., ~(Mask Reg) where~represents a bitwise not/complement as defined for the C programming language); then a score of (+2) is assigned to the redundant view for this physical characteristic. In this case the synchronous redundant device is in a steady state (i.e., unmasked status has not changed since the last time status data was analyzed for this synchronous redundant device).

FIG. 6 illustrates scores for logical characteristic 600 in accordance with certain implementations of the invention. For up to three active interrupts in an active interrupt register, a score of (+1) is added to the score for the redundant view for this logical characteristic. In this case, each bit in the resulting output of bitwise ANDing the status and mask registers together is determined to be an active interrupt bit. For example, if the status register is 11000011, and the mask register is 11110000, the resulting output (11000000) has 2 active interrupts. For example, if an active interrupt register has two active interrupts, a score of (+2) is assigned to the redundant view for this logical characteristic. For each active interrupt over three in an active interrupt register, a score of (−1) is added to the score for that redundant view for this logical characteristic. For example, if an active interrupt register has five active interrupts, the redundant view would be assigned a score of (+3) for the first three active interrupts and a score of (−2) for the additional two active interrupts, which results in a total score of (+1) for these logical characteristics. If both the STATUS and NOT STATUS (i.e., logically the Good and Not Good indicators) bits are set, then a score of (−3) is assigned to the redundant view for this logical characteristic. If a redundant, partner or paired resource associated with the status register is reporting a different status, then a score of (−2) is assigned to the redundant view. In this case, the status register contents reflect different values than values that another device reports through another reporting route. If an uninstalled resource is posting an active interrupt, then a score of (−3) is assigned to the redundant view for this logical characteristic. That is, there is no module X in the synchronous redundant device, but the synchronous redundant device is posting an active interrupt for module X.

FIG. 7 illustrates scores for virtual characteristics 700 in accordance with certain implementations of the invention. If a synchronous redundant device has the highest random events counter in a period of time ("thresholding window"), then a score of (−1) is assigned to the redundant view for this virtual characteristics. An example of a random event is that one central electronic complex 204, 206 restarts as if it had been unplugged from a power supply and then plugged back into the power supply. If this synchronous redundant device has the highest power error counter in a period of time ("thresholding window"), then a score of (−3) is assigned to the redundant view for this virtual characteristic. If the synchronous redundant device has the highest overall count in a period of time ("thresholding window") (i.e., the device has seen the most generic events), then this redundant view is assigned a score of (−2).

In this example, synchronous redundant devices 122a and 122n are presenting different status data in Status Register X. The central electronic complexes 204, 206 agree on each synchronous redundant device's 122a and 122n individual status. That is, each central electronic complex 204, 206 obtained status data from synchronous redundant devices 122a ... 122n, and the status data between these synchronous redundant devices 122a ... 122n conflict, but each central electronic complex obtained the same conflicting data, so the disagreement appears to be limited to the synchronous redundant devices 122a and 122n.

Synchronous redundant device 122a (RPC- 0) is posting a status of 0x0F (i.e., 00001111) in a status register, which, along with a mask register with 0x0F, provides an active interrupt register with 0x0F. Referring to Table-1, for a status register with 0x0F, NOT STATUS A, NOT STATUS B, and NOT STATUS C are true. Synchronous redundant device 122n (RPC-1), on the other hand, is posting a status of 0xE1 (i.e., 11100001) in a status register, which, along with a mask register with 0x0F provides an active interrupt register with 0x01. Referring to Table-1, for a status register with 0xE1, STATUS A, STATUS B, and NOT STATUS C are true. Combined with a mask register having NOT STATUS A, NOT STATUS B, and NOT STATUS C, the resulting active interrupt register has NOT STATUS C. The interrupts have been reset, but the disagreement appears permanent, so the selection system 120 selects one synchronous redundant device so that status data from that selected synchronous redundant device may be used for further processing.

The selection system 120 generates a redundant view score for both synchronous redundant devices 122a and 122n and, in this example, selects status data from the synchronous redundant device with the highest score. In certain implementations, the selection system 120 also performs additional analysis to handle the redundant views that are not selected. For example, a message may be sent to a system administrator to check the synchronous redundant device with the lower score.

In this example, for synchronous redundant device 122a (RPC-0), for physical characteristics illustrated in FIG. 5, it is not true that the status register equals all zeroes or all ones, the reserved or unimplemented bit is active in the status register (resulting in a score of (−5) being added), the active interrupt equals the mask register (resulting in a score of (+2) being added), and it is not true that the status register equals ~(mask register). Thus, there is a score of (−3) for physical characteristics.

In this example, for synchronous redundant device 122a (RPC-0), for logical characteristics illustrated in FIG. 6, there are four active interrupts, so, a score of (+3) is added, and for the one active interrupt over the three threshold, a score of (−1) is added. The good and not good bits are not both set. The redundant/partner/paired resource behind register reporting different status and the uninstalled resource posting active interrupt are not applicable. Thus, there is a score of (+2) for the logical characteristics.

In this example, for synchronous redundant device 122a (RPC-0), for virtual characteristics illustrated in FIG. 7, synchronous redundant device 122a (RPC-0) has the highest overall count of a thresholding window, which results in a score of (−2) being added. Thus, there is a score of (−2) for the virtual characteristics.

In particular, for synchronous redundant device 122a (RPC-0), the selection system 120 determines a score of −3 for physical characteristics, a score of +2 for logical characteristics, and a score of −2 for virtual characteristics.

In this example, for synchronous redundant device 122n (RPC-1), for physical characteristics illustrated in FIG. 5, it is not true that the status register equals all zeroes or all ones, the reserved or unimplemented bit is not active in the status register, the active interrupt does not equal the mask register, and it is not true that the status register equals ~(mask register). Thus, there is a score of (0) for the physical characteristics.

In this example, for synchronous redundant device 122n (RPC-1), for logical characteristics illustrated in FIG. 6, there is one active interrupt, so a score of (+1) is added. The good and not good bits are not both set. The redundant/partner/paired resource behind register reporting different status and the uninstalled resource posting active interrupt are not applicable. Thus, there is a score of (+1) for the logical characteristics.

In this example, for synchronous redundant device 122n (RPC-1), for virtual characteristics illustrated in FIG. 7, none of the characteristics is tree. Thus, there is a score of (0) for the virtual characteristics.

In particular, for synchronous redundant device 122n (RPC-1), the selection system 120 determines a score of (0) for physical characteristics, a score of (+1) for logical characteristics, and a score of (0) for virtual characteristics.

Thus, in this example, the selection system 120 generates a score of (−3) for synchronous redundant device 122a (RPC-0) and a score of (+1) for synchronous redundant device 122n (RPC-1). Because synchronous redundant device 122n (RPC-1) has a higher score, the selection system 120 selects the redundant view from synchronous redundant device 122n (RPC-1) for further processing.

Based on these scores, the selection system decides that synchronous redundant device 122n (RPC-1) is posting better status and should be selected. In case of a tie score for redundant views, one or more factors (e.g., one or more characteristics other than the set of characteristics that resulted in the tie) may be used to determine a winner, but with the amount of criteria used by the selection system 120, ties are not expected to occur. This provides a quantitative, repeatable, consistent, and reliable technique for determining which of two disagreeing synchronous redundant devices should be trusted. Furthermore, as additional criteria are identified, they can be easily added to the scoring process, and weighed for all cases of disagreement.

In conventional systems, the decision was somewhat arbitrary, and if any logic was used to make a decision, it would be based on only one or two characteristics. For example, some conventional systems may arbitrarily choose synchronous redundant device 122a (RPC-0). Some conventional systems may choose synchronous redundant device 122a (RPC-0) because it had more active interrupts. Other conventional systems may choose synchronous redundant device 122n (RPC-1) because the status register of synchronous redundant device 122n more closely matches the mask (i.e., the zeroed bits) in the mask register. Regardless, conventional systems are not consistent in choosing status data from one synchronous redundant device, and, in many cases, used limited logic or made and incorrect guess.

Implementations of the invention weigh multiple criteria and make a decision based on all the available data. Furthermore, the techniques of implementations of the invention are modular and reusable. Thus, implementations of the invention may be used for all status data disagreements, which provides consistency across error analysis.

Due to the complexity of the communication path as well as the inherent timing issues, disagreements among the status data from redundant views may occur. When a disagreement occurs, the selection system 120 selects one set of status data to analyze. Again two different sets of status data that present mutually exclusive status cannot be simultaneously analyzed.

In certain implementations, after scanning and scoring all registers based on a variety of characteristics, each redundant view is assigned a redundant view score, and the redundant view with the highest score is used for analysis. In certain implementations, when a computing system 202 or computing device 102 has the ability to take a device off-line, the redundant view with the lowest redundant view score may be handled as desired. Analysis may then proceed with the selected redundant view.

Implementations of the invention provide scalability and reusability. For example, the scoring process may be compartmentalized and then invoked as necessary whenever a disagreement between status data from different synchronized redundant devices 122a . . . 122n is noted. Furthermore, the scoring process applies to multiple synchronous redundant devices and to multiple systems (i.e., a network that includes the synchronous redundant devices 122a . . . 122n and the computing device 102 or computing system 202). Therefore, an entire system may use a consistent and common technique for handling disagreement in status data from redundant views based on physical, logical, and virtual characteristics.

Thus, the selection system 120 chooses the status data that is most likely presenting correct and accurate status. There is not one "good" device and one "bad" device, there are two devices successfully and correctly presenting status/data, yet the output of said presentation is incompatible and irreconcilable. Implementations of the invention solve this problem through automatic and autonomic discernment.

Implementations of the invention provide a consistent, quantitative technique for deciding which set of status data to use when different status data is reported from synchronous redundant devices, without the overhead of LRC or CRC techniques, but with more accuracy than arbitrary selection of status data. Implementations of the invention also avoid the problems of conventional techniques that use only one or a few criteria for assessing validity by using a very large set of various criteria of different types from a large set of sources and balancing the criteria using a quantitative scoring system.

Additional Implementation Details

The described implementations may be implemented as a method, apparatus or article of manufacture using programming and/or engineering techniques to produce software, firmware, hardware, or any combination thereof. The term "article of manufacture" and "circuitry" as used herein refers to a state machine, code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. When the code or logic is executed by a processor, the circuitry may include the medium including the code or logic as well as the processor that executes the code loaded from the medium. The code in which preferred implementations are implemented may further be accessible from a file server over a network. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any information bearing medium known in the art.

Additionally, the devices, adapters, etc., may be implemented in one or more integrated circuits on the adapter or on the motherboard.

Certain implementations may be directed to a method for deploying computing instruction by a person or automated processing integrating computer-readable code into a computing system, wherein the code in combination with the computing system is enabled to perform the operations of the described implementations.

The logic of FIGS. 3 and 4 describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 3 and 4 may be implemented in software, hardware, programmable and non-programmable gate array logic or in some combination of hardware, software, or gate array logic.

The foregoing description of implementations of the invention has been presented for the purposes of illustration and description. It is not intended to be exhaustive or to limit the implementations of the invention to the precise form disclosed. Many modifications and variations are possible in light of the above teaching. It is intended that the scope of the implementations of the invention be limited not by this detailed description, but rather by the claims appended hereto. The above specification, examples and data provide a complete description of the manufacture and use of the composition of the implementations of the invention. Since many implementations of the invention can be made without departing from the spirit and scope of the implementations of the invention, the implementations of the invention reside in the claims hereinafter appended or any subsequently-filed claims, and their equivalents.

What is claimed is:

1. A method for selecting status data, comprising:
    obtaining redundant views of the status data from multiple synchronous redundant devices;
    determining that the redundant views from the multiple synchronous redundant devices are conflicting;
    calculating a redundant view score for each of the redundant views based on one or more characteristics from each of at least two characteristic types, wherein the characteristic types are physical, logical, and virtual, wherein weighted scores are pre-assigned to possible values for the one or more characteristics, and wherein a score is determined for a characteristic based on a value of the status data for the characteristic and the pre-assigned possible values; and
    selecting one of the redundant views based on the calculated redundant view score for each of the redundant views.

2. The method of claim 1, wherein calculating the redundant view score further comprises:
    selecting each of the characteristic types; and
    assigning a score to each redundant view for each characteristic type.

3. The method of claim 2, further comprising:
    summing the assigned scores for each characteristic type to generate a redundant view score for a redundant view.

4. The method of claim 1, wherein the weighted scores are modified while a computing device to which the synchronous redundant devices are connected is in operation and wherein the synchronous redundant devices correspond to the redundant views.

5. The method of claim 1, wherein the synchronous redundant devices are devices that are multiple units of a same type of device that are in synch with each other.

6. The method of claim 1, wherein the one or more characteristics include physical characteristics that are associated with hardware indicators in the status data.

7. The method of claim 1, wherein the one or more characteristics include logical characteristics that are associated with values that the hardware indicators represent.

8. The method of claim 1, wherein the one or more characteristics include virtual characteristics that directly relate to other hardware devices, other system and device indicators, and to the overall synchronous redundant devices.

9. The method of claim 1, wherein the redundant views provide different sets of status data that present mutually exclusive status.

10. A method for deploying computing infrastructure, comprising:
    integrating computer-readable code into a computing system that includes a processor, wherein the code in combination with the computing system performs:
        obtaining redundant views from multiple synchronous redundant devices;
        determining that the redundant views from the multiple synchronous redundant devices are conflicting;
        calculating a redundant view score for each of the redundant views based on one or more characteristics from each of at least two characteristic types, wherein the characteristic types are physical, logical, and virtual, wherein weighted scores are pre-assigned to possible values for the one or more characteristics, and wherein a score is determined for a characteristic based on a value of the status data for the characteristic and the pre-assigned possible values; and
        selecting one of the redundant views based on the calculated redundant view score for each of the redundant views.

11. The method of claim 10, wherein calculating the redundant view score further comprises:
    selecting each of the characteristic types; and
    assigning a score to each redundant view for each characteristic type.

12. The method of claim 11, further comprising:
    summing the assigned scores for each characteristic type to generate a redundant view score for a redundant view.

13. The method of claim 10, wherein the weighted scores are modified while a computing device to which the synchronous redundant devices are connected is in operation and wherein the synchronous redundant devices correspond to the redundant views.

14. An article of manufacture for selecting status data, wherein the article of manufacture comprises a computer readable storage medium storing instructions, wherein the instructions when executed by a processor of a computer are capable of causing cause operations to be performed, and wherein the operations comprise:
    obtaining redundant views of the status data from multiple synchronous redundant devices;
    determining that the redundant views from the multiple synchronous redundant devices are conflicting;
    calculating a redundant view score for each of the redundant views based on one or more characteristics from each of at least two characteristic types, wherein the characteristic types are physical, logical, and virtual, wherein weighted scores are pre-assigned to possible values for the one or more characteristics, and wherein a score is determined for a characteristic based on a value of the status data for the characteristic and the pre-assigned possible values; and selecting one of the redundant views based on the calculated redundant view score for each of the redundant views.

15. The article of manufacture of claim 14, wherein the operations for calculating the redundant view score further comprise:

selecting each of the characteristic types; and assigning a score to each redundant view for each characteristic type.

16. The article of manufacture of claim 15, wherein the operations further comprise:

summing the assigned scores for each characteristic type to generate a redundant view score for a redundant view.

17. The article of manufacture of claim 14, wherein the weighted scores are modified while a computing device to which the synchronous redundant devices are connected is in operation and wherein the synchronous redundant devices correspond to the redundant views.

18. The article of manufacture of claim 14, wherein the synchronous redundant devices are devices that are multiple units of a same type of device that are in synch with each other.

19. The article of manufacture of claim 14, wherein the one or more characteristics include physical characteristics that are associated with hardware indicators in the status data.

20. The article of manufacture of claim 14, wherein the one or more characteristics include logical characteristics that are associated with values that the hardware indicators represent.

21. The article of manufacture of claim 14, wherein the one or more characteristics include virtual characteristics that directly relate to other hardware devices, other system and device indicators, and to the overall synchronous redundant devices.

22. The article of manufacture of claim 14, wherein the redundant views provide different sets of status data that present mutually exclusive status.

23. A system for selecting status data, comprising:

storage; and circuitry performing operations, the operations comprising:

obtaining redundant views of the status data from multiple synchronous redundant devices;

determining that the redundant views from the multiple synchronous redundant devices are conflicting;

calculating a redundant view score for each of the redundant views based on one or more characteristics from each of at least two characteristic types, wherein the characteristic types are physical, logical, and virtual, wherein weighted scores are pre-assigned to possible values for the one or more characteristics, and wherein a score is determined for a characteristic based on a value of the status data for the characteristic and the pre-assigned possible values; and selecting one of the redundant views based on the calculated redundant view score for each of the redundant views.

24. The system of claim 23, wherein the operations for calculating the redundant view score further comprise:

selecting each of the characteristic types; and assigning a score to each redundant view for each characteristic type.

25. The system of claim 24, wherein the operations further comprise:

summing the assigned scores for each characteristic type to generate a redundant view score for a redundant view.

26. The system of claim 23, wherein the weighted scores are modified while a computing device to which the synchronous redundant devices are connected is in operation and wherein the synchronous redundant devices correspond to the redundant views.

27. The system of claim 23, wherein the synchronous redundant devices are devices that are multiple units of a same type of device that are in synch with each other.

28. The system of claim 23, wherein the one or more characteristics include physical characteristics that are associated with hardware indicators in the status data.

29. The system of claim 23, wherein the one or more characteristics include logical characteristics that are associated with values that the hardware indicators represent.

30. The system of claim 23, wherein the one or more characteristics include virtual characteristics that directly relate to other hardware devices, other system and device indicators, and to the overall synchronous redundant devices.

31. The system of claim 23, wherein the redundant views provide different sets of status data that present mutually exclusive status.

* * * * *

UNITED STATES PATENT AND TRADEMARK OFFICE
CERTIFICATE OF CORRECTION

PATENT NO. : 7,624,336 B2  Page 1 of 1
APPLICATION NO. : 10/984071
DATED : November 24, 2009
INVENTOR(S) : Crawford et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1131 days.

Signed and Sealed this

Twenty-sixth Day of October, 2010

David J. Kappos
*Director of the United States Patent and Trademark Office*